US011954152B2

(12) United States Patent
Jiang et al.

(10) Patent No.: US 11,954,152 B2
(45) Date of Patent: Apr. 9, 2024

(54) VIDEO MATCHING METHODS AND APPARATUSES, AND BLOCKCHAIN-BASED INFRINGEMENT EVIDENCE STORAGE METHODS AND APPARATUSES

(71) Applicant: ALIPAY (HANGZHOU) INFORMATION TECHNOLOGY CO., LTD., Zhejiang (CN)

(72) Inventors: Chen Jiang, Hangzhou (CN); Wei Zhang, Hangzhou (CN); Qing Wang, Hangzhou (CN); Yuan Cheng, Hangzhou (CN); Furong Xu, Hangzhou (CN); Kaiming Huang, Hangzhou (CN); Xiaobo Zhang, Hangzhou (CN); Feng Qian, Hangzhou (CN); Xudong Yang, Hangzhou (CN); Tan Pan, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/149,552

(22) Filed: Jan. 3, 2023

(65) Prior Publication Data
US 2023/0177084 A1 Jun. 8, 2023

Related U.S. Application Data

(63) Continuation of application No. PCT/CN2021/105214, filed on Jul. 8, 2021.

(30) Foreign Application Priority Data

Aug. 14, 2020 (CN) .......................... 202010816354.9

(51) Int. Cl.
*G06F 16/78* (2019.01)
*G06F 16/73* (2019.01)
(Continued)

(52) U.S. Cl.
CPC ........ *G06F 16/7837* (2019.01); *G06F 16/732* (2019.01); *G06F 16/7867* (2019.01); *G06N 3/091* (2023.01)

(58) Field of Classification Search
None
See application file for complete search history.

(56) References Cited

U.S. PATENT DOCUMENTS

2007/0203940 A1* 8/2007 Wang ..................... G06F 16/951
2015/0170333 A1* 6/2015 Jing ....................... G06F 16/532
345/660

(Continued)

FOREIGN PATENT DOCUMENTS

CN 102737135 10/2012
CN 106778464 5/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Son T Hoang
(74) *Attorney, Agent, or Firm* — Fish & Richardson P.C.

(57) ABSTRACT

The present specification discloses video matching. In a computer-implemented method, a plurality of feature vectors of a target video is obtained. A candidate video similar to the target video is retrieved from a video database based on the plurality of feature vectors of the target video. A time domain similarity matrix feature map is constructed between the target video and the candidate video based on the target (Continued)

video and the candidate video. Using the time domain similarity matrix feature map as an input into a deep learning detection model, a video segment matching the target video in the candidate video and a corresponding similarity is output.

21 Claims, 7 Drawing Sheets

(51) Int. Cl.
    *G06F 16/732*     (2019.01)
    *G06F 16/783*     (2019.01)
    *G06N 3/091*     (2023.01)

(56) References Cited

U.S. PATENT DOCUMENTS

| | | | |
|---|---|---|---|
| 2017/0289409 A1 | 10/2017 | Min et al. | |
| 2020/0265239 A1* | 8/2020 | Guo | G06F 16/78 |
| 2020/0349385 A1* | 11/2020 | Xu | G06F 16/583 |
| 2022/0027407 A1* | 1/2022 | Ikezoye | G06F 16/683 |

FOREIGN PATENT DOCUMENTS

| | | |
|---|---|---|
| CN | 106778686 | 5/2017 |
| CN | 106991373 | 7/2017 |
| CN | 107180056 | 9/2017 |
| CN | 108763295 | 11/2018 |
| CN | 110851761 | 2/2020 |
| CN | 110958319 | 4/2020 |
| CN | 111737522 | 10/2020 |
| TW | 202018557 | 5/2020 |

OTHER PUBLICATIONS

International Search Report and Written Opinion in International Appln. No. PCT/US2021/05214, dated Oct. 11, 2021, 16 pages(with English translation).
International Preliminary Report on Patentability in International Appln. No. PCT/US2021/05214, dated Feb. 23, 2023, 7 pages.
Nakamoto, "Bitcoin: A Peer-to-Peer Electronic Cash System," www.bitcoin.org, 2008, 9 pages.
Zhou, "The research on content-based video copy detection algorithm," Thesis for the degree of Master of Science in Communication Engineering, Hunan University, Mar. 2010, 68 pages (with English Abstract).
aliyun.com [online], "Video DNA," available on or before Sep. 6, 2019, via Internet Archive: Wayback Machine URL <http://web.archive.org/web/20230000000000*/https://ai.aliyun.com/vi/dna>, retrieved on May 16, 2023, URL<https://ai.aliyun.com/vi/dna>, 10 pages.
datafountain.cn [online], "Video copyright detection algorithm," Nov. 6, 2019, retrieved on May 16, 2023, retrieved from URL <https://www.datafountain.cn/competitions/354/datasets>, 4 pages.
huaweicloud.com [online], "Video fingerprint VFP," available on or before Aug. 9, 2020, via Internet Archive: Wayback Machine URL <http://web.archive.org/web/20230000000000*/https://www.huaweicloud.com/product/vfp.html>, retrieved on May 16, 2023, URL<https://www.huaweicloud.com/product/vfp.html>, 1 page.

* cited by examiner ns and apparatuses, to cope with mismatching and missed matching between a plurality of types of features of videos, and support infringement positioning of a plurality of video segments, so as to improve video matching efficiency, and reduce manual audit costs.

VIDEO MATCHING METHODS AND APPARATUSES, AND BLOCKCHAIN-BASED INFRINGEMENT EVIDENCE STORAGE METHODS AND APPARATUSES

CROSS-REFERENCE TO RELATED APPLICATIONS

This application is a continuation of PCT Application No. PCT/CN2021/105214, filed on Jul. 8, 2021, which claims priority to Chinese Patent Application No. 202010816354.9, filed on Aug. 14, 2020, and each application is hereby incorporated by reference in its entirety.

TECHNICAL FIELD

The present document relates to the field of computer technologies, and in particular, to video matching methods and blockchain-based infringement evidence storage methods and apparatuses.

BACKGROUND

Currently, when infringement positioning is performed on a certain suspected infringement video, a plurality of types of features are first extracted from the video and then a search engine performs retrieval, to obtain matching results of a plurality of candidate videos matching the video. When final infringement positioning is performed on the suspected infringement video, a similarity between each of the plurality of candidate videos and the suspected infringement video needs to be calculated separately. Mismatching and missed matching between a plurality of types of features of videos need to be coped with based on a high robustness algorithm, and infringement positioning of a plurality of video segments is supported.

However, the existing video matching methods are easily affected by noise of a feature retrieval result, and efficiency of matching between videos decreases sharply as video duration increases. In addition, storage of the infringement video and infringement evidence of the infringement video is an urgent problem to resolve for the industry.

SUMMARY

Embodiments of the present specification provide video matching methods and blockchain-based infringement evidence storage methods and apparatuses, to cope with mismatching and missed matching between a plurality of types of features of videos, and support infringement positioning of a plurality of video segments, so as to improve video matching efficiency, and reduce manual audit costs.

To resolve the technical problems described above, the one or more embodiments of the present specification are implemented as follows: According to a first aspect, a video matching method is provided, including: retrieving a candidate video similar to a target video from a video database based on a plurality of feature vectors of the target video; constructing a time domain similarity matrix feature map between the target video and the candidate video based on the target video and the candidate video; using the time domain similarity matrix feature map as an input into a deep learning detection model, to output a video segment matching the target video in the candidate video and a corresponding similarity; and uploading infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a second aspect, a blockchain-based video infringement evidence storage method is provided, including: obtaining a plurality of feature vectors of a target video; retrieving a candidate video similar to the target video from a video database based on the plurality of feature vectors of the target video; constructing a time domain similarity matrix feature map between the target video and the candidate video based on the target video and the candidate video; and using the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a third aspect, a blockchain-based infringement evidence storage apparatus is provided, including: a candidate video retrieval module, configured to retrieve a candidate video similar to a target video from a video database based on a plurality of feature vectors of the target video; a feature map construction module, configured to construct a time domain similarity matrix feature map between the target video and the candidate video based on the target video and the candidate video; a model output module, configured to use the time domain similarity matrix feature map as an input into a deep learning detection model, to output a video segment matching the target video in the candidate video and a corresponding similarity; and an evidence uploading module, configured to upload infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a fourth aspect, a video matching apparatus is provided, including: a feature vector acquisition module, configured to obtain a plurality of feature vectors of a target video; a candidate video retrieval module, configured to retrieve a candidate video similar to the target video from a video database based on the plurality of feature vectors of the target video; a feature map construction module, configured to construct a time domain similarity matrix feature map between the target video and the candidate video based on the target video and the candidate video; and a model output module, configured to use the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a fifth aspect, an electronic device is provided, including: a processor; and a storage, configured to store a computer-executable instruction. When the computer-executable instruction is executed, the processor is enabled to perform the following operations: retrieving a candidate video similar to a target video from a video database based on a plurality of feature vectors of the target video; constructing a time domain similarity matrix feature map between the target video and the candidate video based on the target video and the candidate video; using the time domain similarity matrix feature map as an input into a deep learning detection model, to output a video segment matching the target video in the candidate video and a corresponding similarity; and uploading infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a sixth aspect, a computer-readable storage medium is provided. The computer-readable storage medium stores one or more programs, and when the one or more programs are executed by an electronic device including a plurality of application programs, the electronic device is enabled to perform the following operations: retrieving a candidate video similar to a target video from a video database based on a plurality of feature vectors of the target video; constructing a time domain similarity matrix feature map between the target video and the candidate video based on the target video and the candidate video; using the time domain similarity matrix feature map as an input into a deep learning detection model, to output a video segment matching the target video in the candidate video and a corresponding similarity; and uploading infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to a seventh aspect, an electronic device is provided, including: a processor; and a storage, configured to store a computer-executable instruction, where when the computer-executable instruction is executed, the processor is enabled to perform the following operations: obtaining a plurality of feature vectors of a target video; retrieving a candidate video similar to the target video from a video database based on the plurality of feature vectors of the target video; constructing a time domain similarity matrix feature map between the target video and the candidate video based on the target video and the candidate video; and using the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to an eighth aspect, a computer-readable storage medium is provided. The computer-readable storage medium stores one or more programs, and when the one or more programs are executed by an electronic device including a plurality of application programs, the electronic device is enabled to perform the following operations: obtaining a plurality of feature vectors of a target video; retrieving a candidate video similar to the target video from a video database based on the plurality of feature vectors of the target video; constructing a time domain similarity matrix feature map between the target video and the candidate video based on the target video and the candidate video; and using the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

The technical solutions used in the one or more embodiments of the present specification can be used to achieve at least the following technical effects: When infringement positioning is performed on the target video, the candidate video similar to the target video can be retrieved from the video database based on the plurality of feature vectors of the target video; the time domain similarity matrix feature map between the target video and the candidate video is constructed based on the target video and the candidate video; the time domain similarity matrix feature map is used as the input into the deep learning detection model, to output the video segment matching the target video in the candidate video and the corresponding similarity; and the infringement evidence including the abstract of the target video, the video segment matching the target video in the candidate video, and the corresponding similarity is uploaded to the blockchain when the similarity corresponding to the video segment matching the target video in the candidate video is greater than or equal to the predetermined similarity threshold. According to the method provided in the one or more embodiments of the present specification, the deep learning detection model is used, so that a plurality of any infringement segments of a possible infringement video can be detected in terms of infringement positioning efficiency, and infringement video detection efficiency can be greatly improved through vector retrieval in combination with the detection model. In addition, manual audit costs are further reduced. In addition, the abstract of the target video with an infringement, the video segment matching the target video in the candidate video, and the corresponding similarity are uploaded to the blockchain based on a non-tamperable characteristic of the blockchain, so that evidence that the target video has the infringement is obtained from the blockchain when the infringement evidence needs to be provided.

BRIEF DESCRIPTION OF DRAWINGS

The accompanying drawings described here are intended to provide a further understanding of the present specification, and constitute a part of the present specification. The illustrative embodiments of the present specification and descriptions thereof are intended to explain the present specification, and do not constitute limitations on the present specification. In the accompanying drawings.

DESCRIPTION OF EMBODIMENTS

To make the objectives, technical solutions, and advantages of the present document clearer, the following clearly and completely describes the technical solutions of the present specification with reference to specific embodiments of the present specification and corresponding accompanying drawings. Clearly, the described embodiments are a part rather than all of the one or more embodiments of the present document. All other embodiments obtained by a person of ordinary skill in the art based on the one or more embodiments of the present specification without creative efforts shall belong to the protection scope of the present document.

The following describes the technical solutions provided in the one or more embodiments of the present specification in detail with reference to the accompanying drawings.

Figure 1:
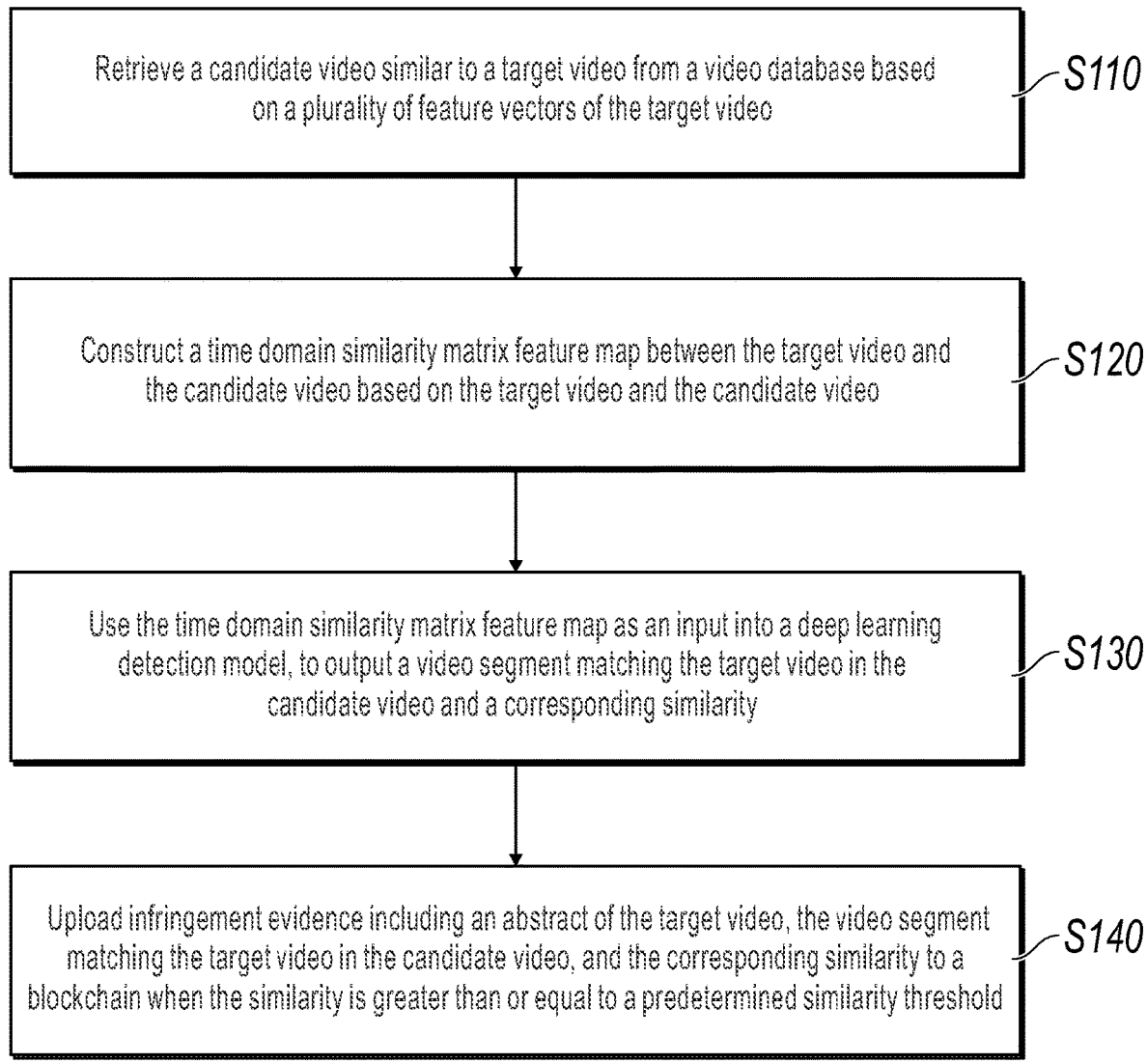
FIG. 1 is a schematic diagram illustrating an implementation procedure of a blockchain-based infringement evidence storage method, according to one or more embodiments of the present specification.

For an infringement video and evidence storage of infringement evidence of the infringement video, it is an urgent problem to be resolved for the industry. In one or more embodiments of the present specification, a blockchain is introduced, and related information of a target video, related information of a candidate video, and information about whether the target video has an infringement are written to the blockchain based on a non-tamperable characteristic of the blockchain, to ensure credibility of infringement information in the blockchain, and quickly provide evidence of whether the target video has the infringement. Specifically, FIG. 1 is a schematic diagram illustrating an implementation procedure of a blockchain-based video infringement evidence storage method, according to one or more embodiments of the present specification. The following steps are included.

S110: Retrieve a candidate video similar to a target video from a video database based on a plurality of feature vectors of the target video.

S120: Construct a time domain similarity matrix feature map between the target video and the candidate video based on the target video and the candidate video.

S130: Use the time domain similarity matrix feature map as an input into a deep learning detection model, to output a video segment matching the target video in the candidate video and a corresponding similarity.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

S140: Upload infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The predetermined similarity threshold can be obtained based on an empirical value, to describe whether the target video has an infringement. For example, the predetermined similarity threshold can be set to 60%. It should be understood that, because storage space in the blockchain is limited, to store the infringement evidence of the target video in the one or more embodiments of the present specification, the target video can be converted into a series of hash values based on a hash encryption algorithm, the hash value of the target video, the video segment matching the target video in the candidate video, and the corresponding similarity are uploaded to the blockchain, and a node having an evidence storage permission performs a consensus operation on the infringement evidence in the blockchain, and then records the infringement evidence in a newly generated block after a consensus. When the infringement evidence needs to be obtained, infringement evidence including the hash value of the target video can be downloaded from the blockchain based on the hash value of the target video.

Figure 2:
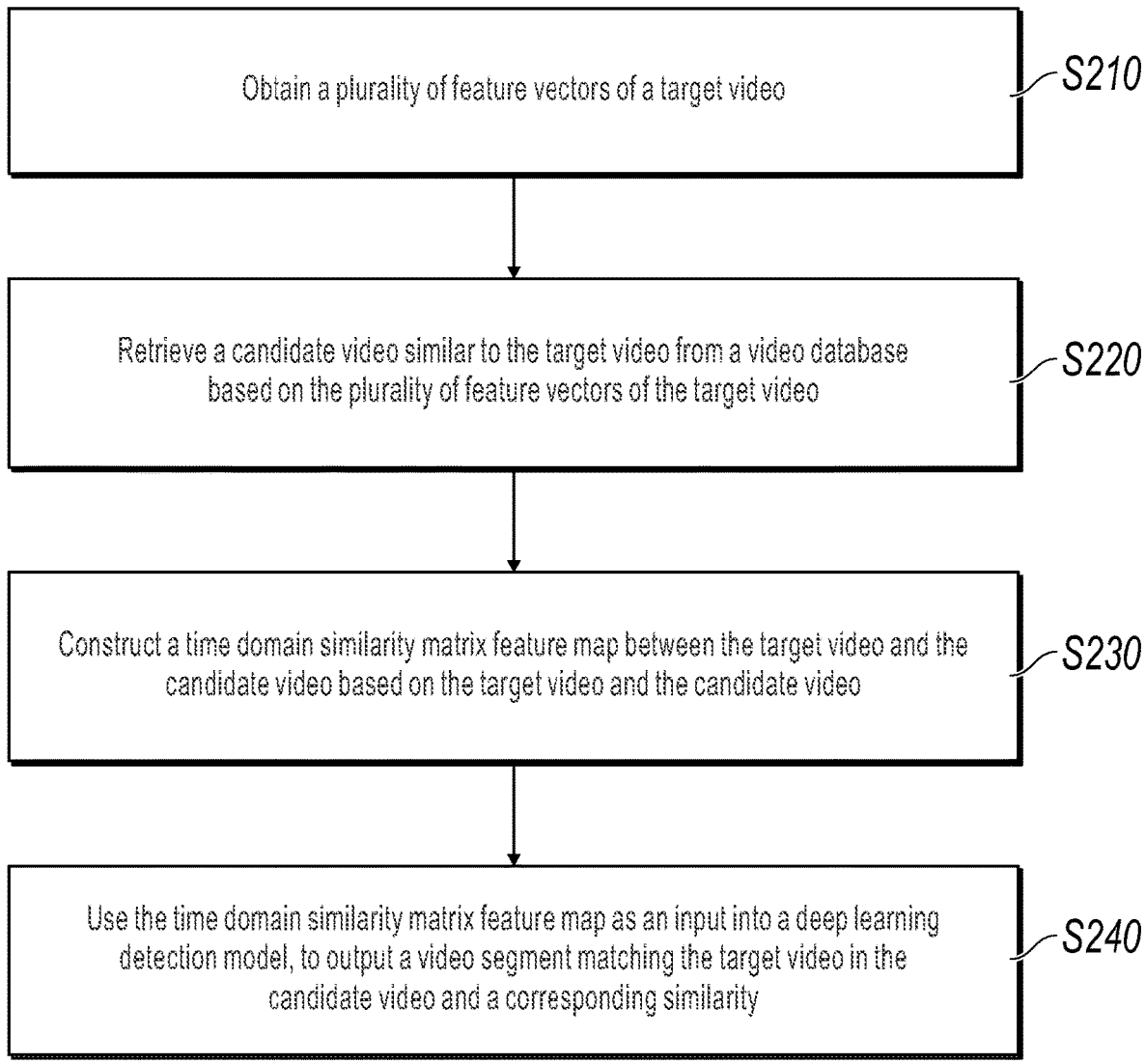
FIG. 2 is a schematic diagram illustrating an implementation procedure of a video matching method, according to one or more embodiments of the present specification.

For a specific implementation of related steps in the embodiment shown in FIG. 1, references can be made to a specific implementation of corresponding steps in the embodiment shown in FIG. 2. Details are omitted here in one or more embodiments of the present specification.

When infringement positioning is performed on the target video, the candidate video similar to the target video can be retrieved from the video database based on the plurality of feature vectors of the target video; the time domain similarity matrix feature map between the target video and the candidate video is constructed based on the target video and the candidate video; the time domain similarity matrix feature map is used as the input into the deep learning detection model, to output the video segment matching the target video in the candidate video and the corresponding similarity; and the infringement evidence including the abstract of the target video, the video segment matching the target video in the candidate video, and the corresponding similarity is uploaded to the blockchain when the similarity corresponding to the video segment matching the target video in the candidate video is greater than or equal to the predetermined similarity threshold. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag. According to the method provided in the one or more embodiments of the present specification, the abstract of the target video with an infringement, the video segment matching the target video in the candidate video, and the corresponding similarity are uploaded to the blockchain based on a non-tamperable characteristic of the blockchain, so that evidence that the target video has the infringement is obtained from the blockchain when the infringement evidence needs to be provided.

As described in the background, when infringement positioning is performed on an infringement video, a plurality of types of feature vectors need to be extracted from the infringement video. After a designated search engine performs retrieval, an obtained vector retrieval result includes matching results of N candidate videos. A similarity between the infringement video and each of these results needs to be calculated, and infringement positioning is performed. Here, mismatching and missed matching between feature vectors need to be coped with based on a high robustness algorithm, and high efficiency is needed if the search result includes a large set of videos roughly sorted by the search engine.

In addition, the video matching algorithm further needs to support infringement positioning of a plurality of video segments, to reduce manual audit costs. However, commonly used solutions such as a dynamic programming algorithm and a CCF competition are easily affected by noise of a feature vector retrieval result, and are not robust enough. In addition, video matching efficiency sharply decreases as duration of the infringement video increases.

In one or more embodiments of the present specification, to resolve an existing problem that infringement video detection efficiency and accuracy are low, a video matching method is further provided. A plurality of feature vectors of a target video can be obtained; a candidate video similar to the target video is retrieved from a video database based on the plurality of feature vectors of the target video; a time domain similarity matrix feature map between the target video and the candidate video is constructed based on the target video and the candidate video; and the time domain similarity matrix feature map is used as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

According to the method provided in the one or more embodiments of the present specification, the deep learning detection model is used, so that a plurality of any infringement segments of a possible infringement video can be detected in terms of infringement positioning efficiency, and infringement video detection efficiency can be greatly improved through vector retrieval in combination with the detection model. In addition, manual audit costs are further reduced.

An execution body of a video method provided in the one or more embodiments of the present specification can include but is not limited to at least one of apparatuses such as a personal computer and a server that can be configured to perform the method provided in the one or more embodiments of the present invention.

For ease of description, the following describes an implementation of the method by using an example in which the execution body of the method is a server that can perform the method. It can be understood that, that the execution body of the method is the server is merely an example description and should not be construed as a limitation on the method.

Specifically, a schematic diagram illustrating an implementation procedure of a video matching method according to one or more embodiments of the present specification is shown in FIG. 2. The method includes S210: Obtain a plurality of feature vectors of a target video.

The target video can be specifically a suspected infringement video, and the candidate video described later can be used as infringement evidence of the suspected infringement video.

Optionally, the obtaining a plurality of feature vectors of a target video can specifically be dividing the target video into a plurality of video segments, and then extracting one or more types of feature vectors for each video segment. Alternatively, frame extraction can be performed on the target video to obtain a plurality of video frames. A key frame can be extracted from the target video, or the plurality of video frames can be randomly extracted from the target video, or one video frame can be extracted from the target video every predetermined time period, to obtain the plurality of video frames; and one or more types of feature vectors can be extracted from the extracted video frames. One feature vector corresponds to one feature extraction algorithm.

Therefore, the plurality of feature vectors of the target video can specifically include a plurality of feature vectors corresponding to a plurality of video segments or video frames of the target video, and one video segment or video frame corresponds to one feature vector; or the plurality of feature vectors of the target video can further include a plurality of types of feature vectors of the target video that are extracted based on a plurality of feature extraction algorithm; or the plurality of feature vectors of the target video can further include a plurality of feature vectors respectively extracted from a plurality of video segments or video frames of the target video based on a plurality of feature extraction algorithms, and one video segment or video frame corresponds to a plurality of types of feature vectors.

S220: Retrieve a candidate video similar to the target video from a video database based on the plurality of feature vectors of the target video.

The video database includes a large amount of videos, each video corresponds to one or more types of feature vectors, and one feature vector corresponds to one feature extraction algorithm.

Optionally, a feature vector matching each feature vector of the target video can be retrieved from the video database based on each of the plurality of feature vectors of the target video, and then a video corresponding to the matched feature vector can be determined as a candidate video. Specifically, the retrieving a candidate video similar to the target video from a video database based on the plurality of feature vectors of the target video includes: obtaining a feature vector retrieval result similar to the plurality of feature vectors of the target video from the video database; and obtaining the candidate video similar to the target video from the video database based on the feature vector retrieval result similar to the plurality of feature vectors of the target video.

The feature vector retrieval result similar to the plurality of feature vectors of the target video can specifically include the first several feature vectors that match all the feature vectors, or one feature vector that best matches all the feature vectors. For example, the first k feature vectors that match all of the plurality of feature vectors of the target video can be separately obtained from the video database, and then m candidate videos corresponding to the first k feature vectors are determined, where m is less than or equal to k and m is greater than or equal to 1. When m=k, it indicates that the k feature vectors are from k different candidate videos, and when m=1, it indicates that the k feature vectors are from the same candidate video. Alternatively, one feature vector that best matches all of the plurality of feature vectors of the target video can be separately obtained from the video database, and then a candidate video corresponding to the best matched feature vector is determined. That is, the feature vector retrieval result may correspond to a plurality of matching feature vectors of one candidate video, or may be different matching feature vectors of a plurality of candidate videos.

Figure 3:
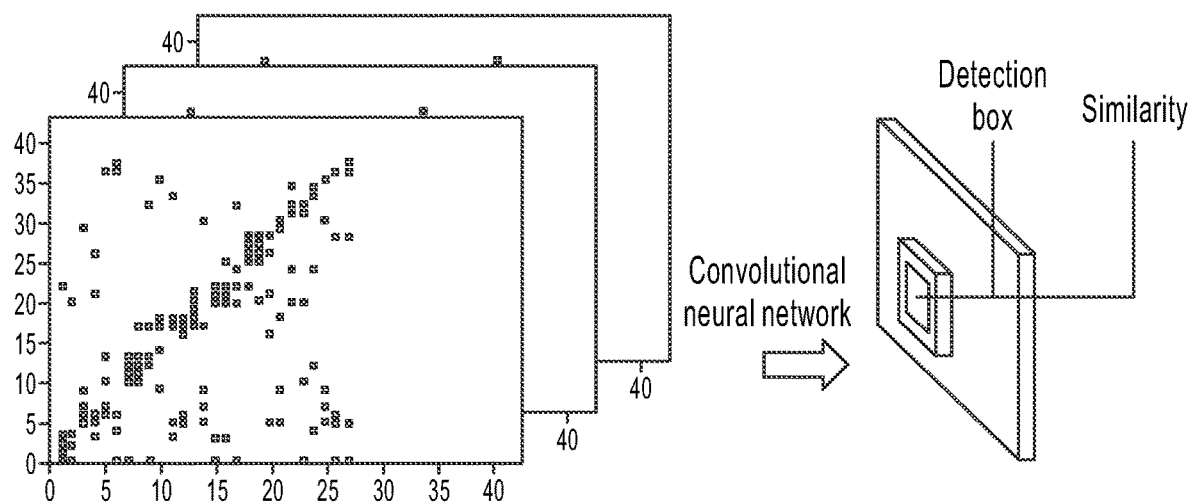
FIG. 3 is a schematic flowchart illustrating a scenario to which a video matching method is applied, according to one or more embodiments of the present specification.

FIG. 3 is a schematic diagram illustrating an actual scenario to which a video matching method provided in one or more embodiments of the present specification is applied. In FIG. 3, q1 to qn are the plurality of feature vectors of the target video, and $V_3$ and $V_1$ are vector retrieval results that are of two candidate videos similar to the target video and that are retrieved from the video database. On a left side of the figure, $V_{3,q1}$ is a value of a similarity between matched positions of the candidate video $V_3$ and the feature vector q1 of the target video, $V_{3,q2}$ is a value of a similarity between matched positions of the candidate video $V_3$ and the feature vector q2 of the target video, $V_{3,qn}$ is a value of a similarity between matched positions of the candidate video $V_3$ and the feature vector qn of the target video. On a right side of the figure, $V_{1,q1}$ is a value of a similarity between matched positions of the candidate video $V_1$ and the feature vector q1 of the target video, and $V_{1,qn}$ is a value of a similarity between matched positions of the candidate video $V_1$ and the feature vector qn of the target video.

S230: Construct a time domain similarity matrix feature map between the target video and the candidate video based on the target video and the candidate video.

It should be understood that, because a vector retrieval result between the plurality of feature vectors of the target video and a plurality of feature vectors of the candidate video can include matched positions (namely, similar positions) of the feature vector of the target video and the feature vector of the candidate video and a similarity between the corresponding positions in FIG. 3, to help a deep learning detection model accurately learn of matched video segments of the target video and the candidate video and a corresponding similarity, the time domain similarity matrix feature map is constructed based on the vector retrieval result between the target video and the candidate video in the one or more embodiments of the present specification. Specifically, the constructing a time domain similarity matrix feature map between the target video and the candidate video based on the target video and the candidate video includes: constructing a similarity matrix between the plurality of feature vectors of the target video and the plurality of feature vectors of the candidate video based on the vector retrieval result between the plurality of feature vectors of the target video and the plurality of feature vectors of the candidate video; and constructing the time domain similarity matrix feature map between the target video and the candidate video in a time domain dimension based on the similarity matrix between the plurality of feature vectors of the target video and the plurality of feature vectors of the candidate video.

Figure 4:
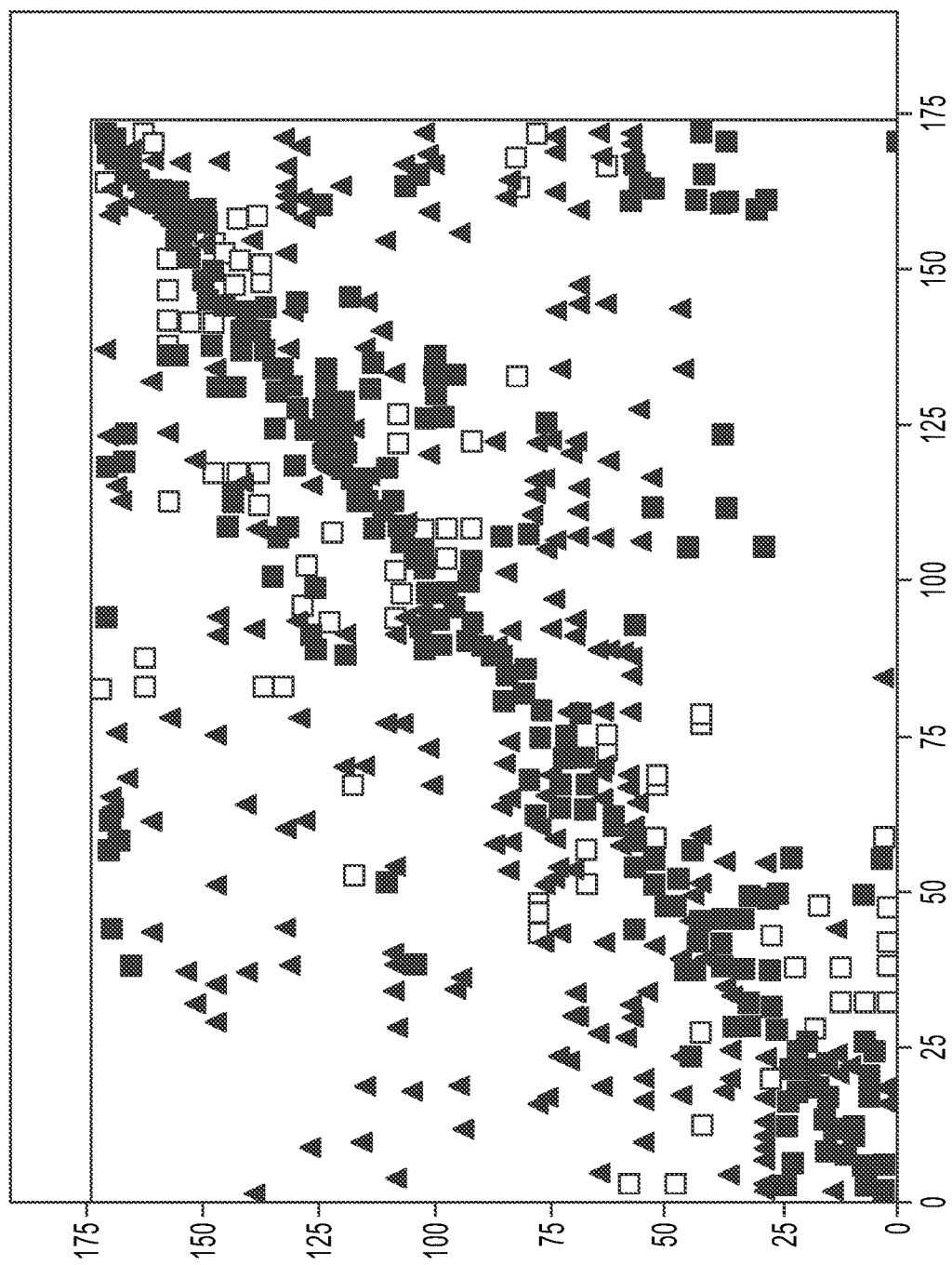
FIG. 4 is a schematic diagram illustrating a time domain similarity matrix feature map drawn in a video matching method, according to one or more embodiments of the present specification.

When there is one candidate video, a distribution of the similarity matrix between the plurality of feature vectors of the target video and the plurality of feature vectors of the candidate video is drawn on a two-dimensional feature map in the same time domain dimension based on the similarity matrix between the plurality of feature vectors of the target video and the plurality of feature vectors of the candidate video. FIG. 4 shows the time domain similarity matrix feature map that is between the target video and the candidate video and that is drawn in the video matching method provided in the one or more embodiments of the present specification. In FIG. 4, an abscissa is a time domain axis of the target video, an ordinate is a time domain value of the candidate video, a triangular pattern corresponds to one feature vector of the target video and the candidate video, a square pattern corresponds to another feature vector of the target video and the candidate video, and a value of each pattern is a similarity score in the vector retrieval result. In actual applications, to improve video matching efficiency, different feature vectors can be drawn in the same time domain similarity matrix feature map.

Alternatively, different feature vectors can be drawn in different time domain similarity matrix feature maps. That is, on a left side of a lower half in FIG. 3, a time domain similarity matrix feature map obtained by drawing each feature vector can be used as an input into one channel of the deep learning detection model. Therefore, when the plurality of feature vectors of the target vector includes a plurality of types of feature vectors, a plurality of time domain similarity matrix feature maps exist and are used as inputs of a plurality of channels of the deep learning detection model.

Optionally, to help the deep learning detection model accurately and efficiently determine similar video segments between the target video and the candidate video and a corresponding similarity, the time domain similarity matrix feature map between the target video and the candidate video can be constructed based on a time domain mapping relationship between the target video and the candidate video in the one or more embodiments of the present specification. Specifically, the constructing the time domain similarity matrix feature map between the target video and the candidate video in a time domain dimension based on the similarity matrix between the plurality of feature vectors of the target video and the plurality of feature vectors of the candidate video includes: drawing the similarity matrix between the plurality of feature vectors of the target video and the plurality of feature vectors of the candidate video on the two-dimensional feature map based on the time domain mapping relationship between the target video and the candidate video, to obtain the time domain similarity matrix feature map between the target video and the candidate video.

Optionally, when there are a plurality of candidate videos, the drawing the similarity matrix between the plurality of feature vectors of the target video and a plurality of feature vectors of each of the candidate video on the two-dimensional feature map based on the time domain mapping relationship between the target video and the candidate video, to obtain the time domain similarity matrix feature map between the target video and the candidate video includes: drawing a similarity matrix between the plurality of feature vectors of the target video and a plurality of feature vectors of each of a plurality of candidate videos on each of a plurality of two-dimensional feature maps based on a time domain mapping relationship between the target video and the plurality of candidate videos, to obtain a plurality of time domain similarity matrix feature maps between the target video and the plurality of candidate videos; and splicing the plurality of time domain similarity matrix feature maps between the target video and the plurality of candidate videos, to obtain a time domain similarity matrix feature map between the target video and the plurality of candidate videos.

When there are a plurality of candidate videos, the similarity matrix between the plurality of feature vectors of the target video and the plurality of feature vectors of each of a plurality of candidate videos can be drawn on each of the plurality of two-dimensional feature maps, to obtain the plurality of time domain similarity matrix feature maps between the target video and the plurality of candidate videos. To improve learning efficiency of the deep learning detection model, the plurality of time domain similarity matrix feature maps can be spliced, to obtain one time domain similarity matrix feature map. For example, when there are four candidate videos, four time domain similarity matrix feature maps between the target video and the four candidate videos are obtained, then the four time domain similarity matrix feature maps are spliced to obtain a 2×2 time domain similarity matrix feature map, and the 2×2 time domain similarity matrix feature map is used as an input into the deep learning detection model.

S240: Use the time domain similarity matrix feature map as an input into the deep learning detection model, to output a video segment matching the target video in the candidate video and a corresponding similarity.

The deep learning detection model is obtained through training based on time domain similarity matrix feature maps of a plurality of groups of sample videos and corresponding labels, the sample video includes a query video and a candidate video corresponding to the query video, a label corresponding to the sample video includes a video segment matching the query video in the sample video in the corresponding candidate video and an infringement flag, and the infringement flag is used to identify whether the matched video segment has an infringement. It should be understood that there can be one or more candidate videos corresponding to the query video. When there are a plurality of candidate videos corresponding to the query video, the sample video includes the query video and a plurality of candidate videos corresponding to the query video, and the label corresponding to the sample video includes a video segment matching the query video in the sample video in each corresponding candidate video and the infringement flag. Specifically, the label corresponding to the sample video includes the video segment and a corresponding label, and the label indicates infringement or non-infringement.

It should be understood that, during training of the deep learning detection model, a label corresponding to a sample video for training the deep learning detection model is usually a discrete label, namely, "yes" or "not", and a corresponding label in the one or more embodiments of the present specification is "infringement" or "non-infringement". When the deep learning detection model performs prediction, a detection box position [x1, y1, x2, y2] and a confidence corresponding to [x1, y1, x2, y2] are output, where [x1, x2] corresponds a matching time segment in the target video, and [y1, y2] corresponds a matching time segment in the candidate video, and the confidence is used to represent a similarity between matching time segments.

A time domain similarity matrix feature map of each group of sample videos is a time domain similarity matrix feature map between this group of query videos and a corresponding candidate video, and a way of obtaining the time domain similarity matrix feature map is the same as the previous way of obtaining the time domain similarity matrix feature map. Details are omitted in the present specification.

Optionally, the deep learning detection model in the one or more embodiments of the present specification includes but is not limited to the following models: a faster convolution neural network based candidate region detection model Faster R-CNN, a masked convolutional neural network based candidate region detection model mask R-CNN, a real-time object detection model YOLO, and a single multi-box detection model SSD.

A training process of the deep learning detection model Faster R-CNN is as follows: entering a test image; entering an entire picture into a convolutional neural network, to extract a feature; and generating a stack of anchor boxes based on an RPN, cropping and filtering the anchor boxes, and determining, by using softmax, that anchors belong to a foreground (foreground) or a background (background), that is, are an object or are not an object, which is a binary classification process. In addition, another branch of bounding box regression is used to modify the anchor box, to form a more accurate proposal (note: being more accurate relative to that of a next time of bounding box regression of a fully connected layer). A proposed window is mapped onto a last layer of a convolutional feature map of the convolutional neural network. Each RoI pooling layer is used to enable each RoI to generate a fixed-size feature map. A classification probability and bounding box regression are jointly trained by using Softmax Loss (detecting the classification probability) and Smooth L1 Loss (detecting the bounding box regression).

The deep learning detection model mask R-CNN is obtained by using the Faster R-CNN as a prototype and adding one branch to be used for a segmentation task. That is, each proposal box of the Faster R-CNN performs semantic segmentation by using an FCN (fully convolutional neural network, where a fully connected layer in the convolutional neural network is converted into convolutional layers). The segmentation task and positioning and classification tasks are performed simultaneously.

The deep learning detection model YOLO (You Only Look Once) is an object detection model. YOLO has a concise architecture based on a CNN and the anchor box, and is a real-time object detection technology for a common use problem. YOLO divides an image into 13×13 cells: Each cell is responsible for predicting five bounding boxes. The bounding box describes a rectangle that surrounds an object. The YOLO further outputs a confidence (namely, the similarity in the one or more embodiments of the present specification), to indicate a degree at which a predicted bounding box actually includes a certain object. A previous detection system performs detection by using a classifier or a locator, a model is applied to a plurality of positions and scales of the image, and a high score region of the image is used as a detection target. YOLO uses completely different methods. YOLO applies a single neural network to the entire image. The network divides the image into regions, predicts a bounding box and a probability of each region, and allocates weights to all bounding boxes based on a value of the probability.

Compared to the Faster R-CNN, there is no process in which the SSD generates the proposal, to greatly improve a detection speed. For detection of targets of different sizes, a convolutional method is to convert the image into different sizes (image pyramid), separately perform detection, and finally combine results (NMS). An SSD algorithm is to perform combination by using feature maps of different convolutional layers, to achieve the same effect. A main network structure of the algorithm is VGG16. Last two fully connected layers are changed to convolutional layers, and then four convolutional layers are added to construct a network structure. Convolution is respectively performed on outputs (feature map) of five different convolution layers by using two different 3×3 convolution cores, one convolution core outputs a confidence used for classification, and each default box generates confidences of 21 classes; and one convolution core outputs localization used for regression, and each default box generates four coordinate values (x, y, w, h).

Optionally, the using the time domain similarity matrix feature map as an input into the deep learning detection model, to output a video segment matching the target video in the candidate video and a corresponding similarity includes: using the time domain similarity matrix feature map as the input into the deep learning detection model, to output an interval range of the video segment matching the target video in the candidate video in the time domain dimension and a similarity between the target video and the matched video segment.

Specifically, the deep learning detection model outputs a detection box position on each time domain similarity matrix feature map and a confidence, to perform infringement positioning on the target video. The interval range of the video segment matching the target video in the candidate video in the time domain dimension can be specifically the detection box position: [x1, y1, x2, y2], where [x1, x2] is a time segment in the target video, [y1, y2] is a time segment in the candidate video, and the similarity between the matched video segments can be specifically represented by using the confidence. As shown on a right side of the lower half in FIG. 3, after the time domain similarity matrix feature map is used as the input into the deep learning detection model, a detection box matching the target video in the candidate video and a similarity between the matched detection boxes can be output.

When infringement positioning is performed on the target video, the plurality of feature vectors of the target video can be obtained, the candidate video similar to the target video is retrieved from the video database based on the plurality of feature vectors of the target video; the time domain similarity matrix feature map between the target video and the candidate video is constructed based on the target video and the candidate video; and the time domain similarity matrix feature map is used as the input into the deep learning detection model, to output the video segment matching the target video in the candidate video and the corresponding similarity. The deep learning detection model is obtained through training based on the time domain similarity matrix feature map of a plurality of groups of sample videos and the corresponding label, the sample video includes a query video and the candidate video corresponding to the query video, and the label corresponding to the sample video includes the video segment matching the query video in the sample video in the corresponding candidate video and the infringement flag. According to the method provided in the one or more embodiments of the present specification, the deep learning detection model is used, so that a plurality of any infringement segments of a possible infringement video can be detected in terms of infringement positioning efficiency, and infringement video detection efficiency can be greatly improved through vector retrieval in combination with the detection model. In addition, manual audit costs are further reduced.

Figures 5, 6:
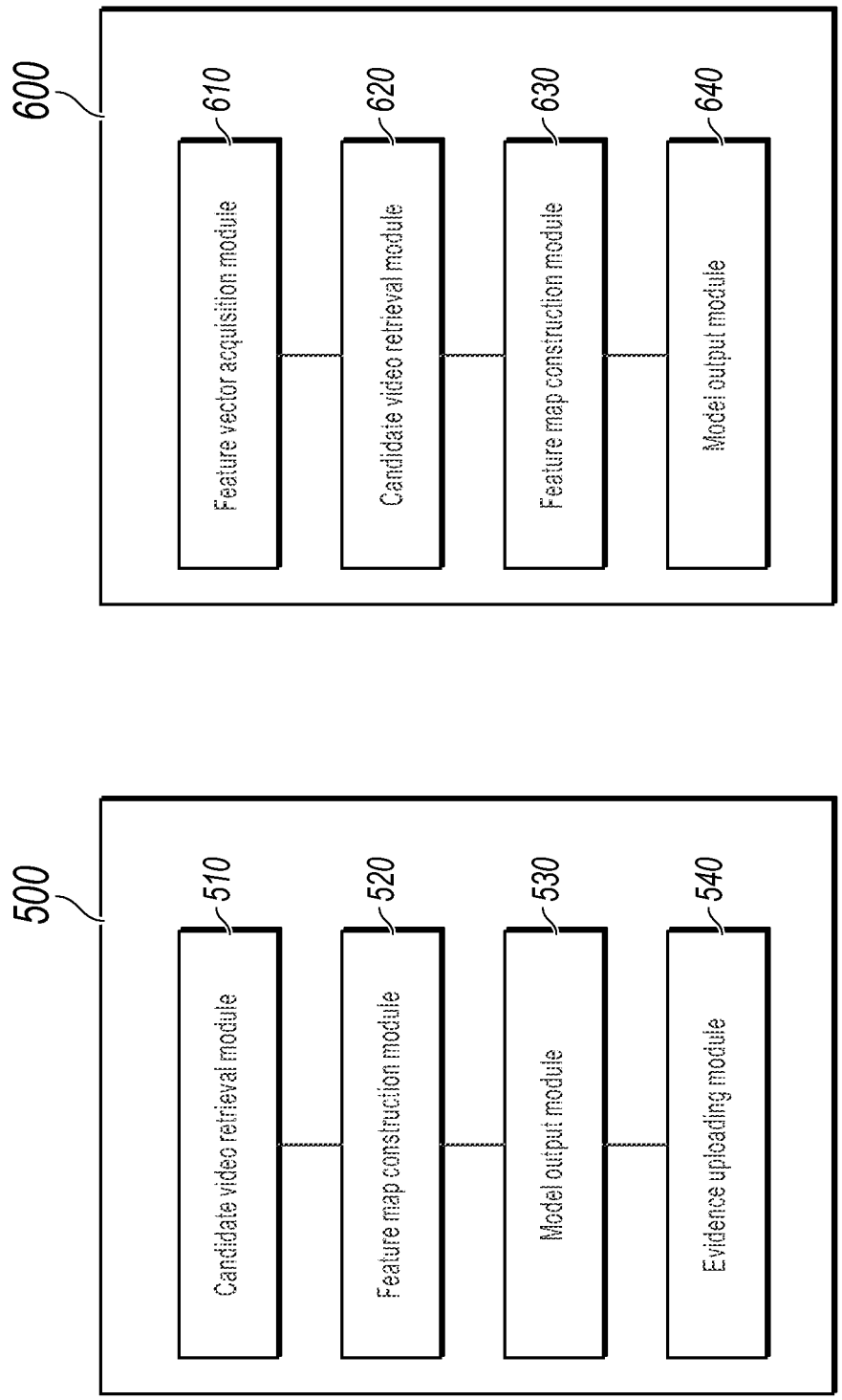
FIG. 5 is a schematic diagram illustrating a structure of a blockchain-based infringement evidence storage apparatus, according to one or more embodiments of the present specification.
FIG. 6 is a schematic diagram illustrating a structure of a video matching apparatus, according to one or more embodiments of the present specification.

FIG. 5 is a schematic diagram illustrating a structure of a blockchain-based infringement evidence storage apparatus 500, according to one or more embodiments of the present specification. The apparatus 500 includes: a candidate video retrieval module 510, configured to retrieve a candidate video similar to a target video from a video database based on a plurality of feature vectors of the target video; a feature map construction module 520, configured to construct a time domain similarity matrix feature map between the target video and the candidate video based on the target video and the candidate video; a model output module 530, configured to use the time domain similarity matrix feature map as an input into a deep learning detection model, to output a video segment matching the target video in the candidate video and a corresponding similarity; and an evidence uploading module 540, configured to upload infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

A video matching apparatus 500 can implement the method in the method embodiments in FIG. 1 and FIG. 2. For details, references can be made to the blockchain-based infringement evidence storage method and the video matching method in the embodiment in FIG. 1 and FIG. 2. Details are omitted.

FIG. 6 is a schematic diagram illustrating a structure of a video matching apparatus 600, according to one or more embodiments of the present specification. The apparatus 600 including: a feature vector acquisition module 610, configured to obtain a plurality of feature vectors of a target video; a candidate video retrieval module 620, configured to retrieve a candidate video similar to the target video from a video database based on the plurality of feature vectors of the target video; a feature map construction module 630, configured to construct a time domain similarity matrix feature map between the target video and the candidate video based on the target video and the candidate video; and a model output module 640, configured to use the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

Optionally, in an implementation, the candidate video retrieval module 620 is configured to: obtain a feature vector retrieval result similar to the plurality of feature vectors of the target video from the video database; and obtain the candidate video similar to the target video from the video database based on the feature vector retrieval result similar to the plurality of feature vectors of the target video.

Optionally, in an implementation, the feature map construction module 630 is configured to: construct a similarity matrix between the plurality of feature vectors of the target video and a plurality of feature vectors of the candidate video based on a vector retrieval result between the plurality of feature vectors of the target video and a plurality of feature vectors of each of the candidate video; and construct the time domain similarity matrix feature map between the target video and the candidate video in a time domain dimension based on the similarity matrix between the plurality of feature vectors of the target video and the plurality of feature vectors of the candidate video.

Optionally, in an implementation, the feature map construction module 630 is configured to: draw the similarity matrix between the plurality of feature vectors of the target video and the plurality of feature vectors of the candidate video on a two-dimensional feature map based on a time domain mapping relationship between the target video and the candidate video, to obtain the time domain similarity matrix feature map between the target video and the candidate video.

Optionally, in an implementation, when there are a plurality of candidate videos, the feature map construction module 630 is configured to: draw a similarity matrix between the plurality of feature vectors of the target video and a plurality of feature vectors of each of a plurality of candidate videos on each of a plurality of two-dimensional feature maps based on a time domain mapping relationship between the target video and the plurality of candidate videos, to obtain a plurality of time domain similarity matrix feature maps between the target video and the plurality of candidate videos; and splice the plurality of time domain similarity matrix feature maps between the target video and the plurality of candidate videos, to obtain a time domain similarity matrix feature map between the target video and the plurality of candidate videos.

Optionally, in an implementation, the model output module 640 is configured to use the time domain similarity matrix feature map as the input into the deep learning detection model, to output an interval range of the video segment matching the target video in the candidate video in a time domain dimension and a similarity between the target video and the matched video segment.

Optionally, in an implementation, the deep learning detection model includes at least one of the following: a faster convolution neural network based candidate region detection model Faster R-CNN, a masked convolutional neural network based candidate region detection model mask R-CNN, a real-time object detection model YOLO, and a single multi-box detection model SSD.

The video matching apparatus 600 can implement the method in the method embodiments in FIG. 2 to FIG. 4. For details, references can be made to the video matching method in the embodiments in FIG. 2 to FIG. 4. Details are omitted.

Figure 7:
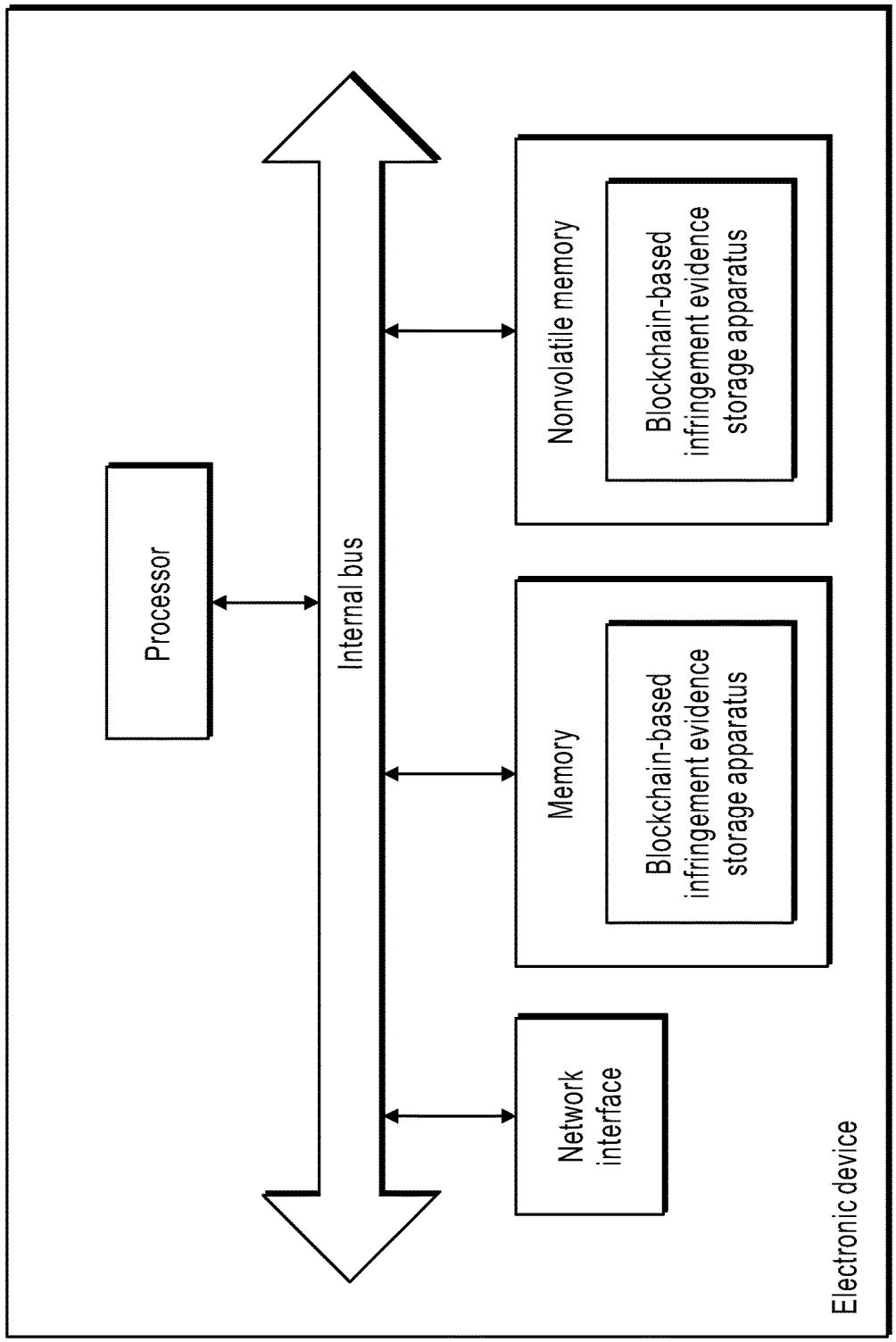
FIG. 7 is a schematic diagram illustrating a structure of an electronic device, according to one or more embodiments of the present specification.

FIG. 7 is a schematic diagram illustrating a structure of an electronic device, according to one or more embodiments of the present specification. Referring to FIG. 7, in terms of hardware, the electronic device includes a processor, and optionally, further includes an internal bus, a network interface, and a storage. The storage may include memory, for example, a high-speed random-access memory (RAM), or may further include a non-volatile memory, for example, at least one magnetic disk memory. Certainly, the electronic device may further include hardware needed for another service.

The processor, the network interface, and the storage can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, the bus is indicated by using only one double-headed arrow in FIG. 7. However, it does not mean that there is only one bus or only one type of bus.

The storage is configured to store a program. Specifically, the program can include program code, and the program code includes a computer operation instruction. The storage can include memory and a non-volatile memory, and provide instructions and data to the processor.

The processor reads a corresponding computer program from the non-volatile memory, and runs the computer program in the memory, to form a blockchain-based infringement evidence storage apparatus in terms of a logical layer. The processor executes the program stored in the storage, and is specifically configured to perform the following operations: retrieving a candidate video similar to a target video from a video database based on a plurality of feature vectors of the target video; constructing a time domain similarity matrix feature map between the target video and the candidate video based on the target video and the candidate video; using the time domain similarity matrix feature map as an input into a deep learning detection model, to output a video segment matching the target video in the candidate video and a corresponding similarity; and uploading infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

The blockchain-based infringement evidence storage method disclosed in the embodiment shown in FIG. 1 in the present specification can be applied to the processor or implemented by the processor. The processor may be an integrated circuit chip and has a signal processing capability. In an implementation process, steps in the previous method can be completed by using an integrated logic circuit of hardware in the processor, or by using instructions in a form of software. The processor can be a general purpose processor, including a central processing unit (CPU), or a network processor (NP); or can be a digital signal processor (DSP), an application-specific integrated circuit (ASIC), a field programmable gate array (FPGA) or another programmable logic device, a discrete gate or a transistor logic device, or a discrete hardware component. The processor can implement or perform the methods, the steps, and logical block diagrams that are disclosed in one or more embodiments of the present specification. The general purpose processor can be a microprocessor, or the processor can be any conventional processor, etc. The steps of the methods disclosed in one or more embodiments of the present specification can be directly performed and completed by a hardware decoding processor, or can be performed and completed by using a combination of hardware and software modules in the decoding processor. The software module can be located in a mature storage medium in the field, for example, a random access memory, a flash memory, a read-only memory, a programmable read-only memory, an electrically erasable programmable memory, or a register. The storage medium is in the storage, and the processor reads information in the storage and completes the steps in the previous method with reference to hardware of the processor.

The electronic device can further perform the blockchain-based infringement evidence storage method in FIG. 1. Details are omitted here in the present specification.

Certainly, in addition to a software implementation, another implementation of the electronic device is not excluded in the present specification, for example, a logic device or a combination of software and hardware. In other words, the execution body of the following processing procedure is not limited to each logic unit, and can be hardware or a logic device.

An embodiment of the present specification further provides a computer-readable storage medium. The computer-readable storage medium stores one or more programs, the one or more programs include an instruction, and when the instruction is executed by a portable electronic device including a plurality of application programs, the portable electronic device is enabled to perform the method in the embodiment shown in FIG. 4, and is specifically to perform the following operations: retrieving a candidate video similar to a target video from a video database based on a plurality of feature vectors of the target video; constructing a time domain similarity matrix feature map between the target video and the candidate video based on the target video and the candidate video; using the time domain similarity matrix feature map as an input into a deep learning detection model, to output a video segment matching the target video in the candidate video and a corresponding similarity; and uploading infringement evidence including an abstract of the target video, the video segment matching the target video in the candidate video, and the corresponding similarity to a blockchain when the similarity corresponding to the video segment matching the target video in the candidate video is greater than or equal to a predetermined similarity threshold.

The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

Figure 8:
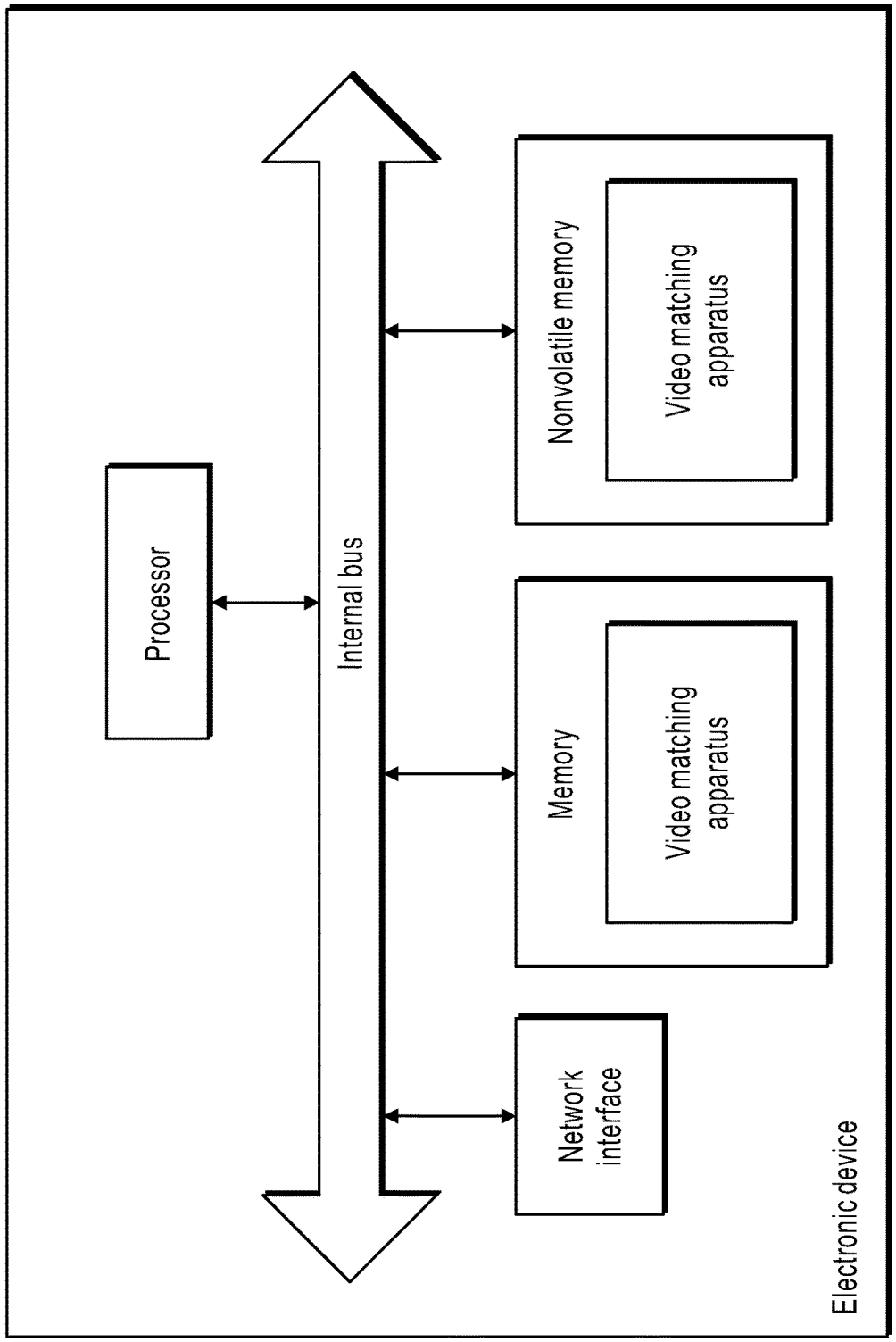
FIG. 8 is a schematic diagram illustrating a structure of another electronic device, according to one or more embodiments of the present specification.

FIG. 8 is a schematic diagram illustrating a structure of an electronic device, according to one or more embodiments of the present specification. Referring to FIG. 8, in terms of hardware, the electronic device includes a processor, and optionally, further includes an internal bus, a network interface, and a storage. The storage may include memory, for example, a high-speed random-access memory (RAM), or may further include a non-volatile memory, for example, at least one magnetic disk memory. Certainly, the electronic device may further include hardware needed for another service.

The processor, the network interface, and the storage can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, the bus is indicated by using only one double-headed arrow in FIG. 8. However, it does not mean that there is only one bus or only one type of bus.

The storage is configured to store a program. Specifically, the program can include program code, and the program code includes a computer operation instruction. The storage can include memory and a non-volatile memory, and provide instructions and data to the processor.

The processor reads a corresponding computer program from the non-volatile memory, and runs the computer program in the storage, to form a video matching apparatus in terms of a logical layer. The processor executes the program stored in the storage, and is specifically configured to perform the following operations: obtaining a plurality of feature vectors of a target video; retrieving a candidate video similar to the target video from a video database based on the plurality of feature vectors of the target video; constructing a time domain similarity matrix feature map between the target video and the candidate video based on the target video and the candidate video; and using the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

Based on the electronic device provided in the one or more embodiments of the present specification, it can be understood that, when infringement positioning is performed on the target video, the plurality of feature vectors of the target video can be obtained; the candidate video similar to the target video is retrieved from the video database based on the plurality of feature vectors of the target video; the time domain similarity matrix feature map between the target video and the candidate video is constructed based on the target video and the candidate video; and the time domain similarity matrix feature map is used as the input into the deep learning detection model, to output the video segment matching the target video in the candidate video and the corresponding similarity. A plurality of any infringement segments of a possible infringement video can be detected in terms of infringement positioning efficiency, and infringement video detection efficiency can be greatly improved through vector retrieval in combination with the detection model. In addition, manual audit costs are further reduced.

The video matching method disclosed in the embodiments shown in FIG. 2 to FIG. 4 is applicable to the processor, or can be implemented by the processor. The processor may be an integrated circuit chip and has a signal processing capability. In an implementation process, steps in the previous method can be completed by using an integrated logic circuit of hardware in the processor, or by using instructions in a form of software. The processor can be a general purpose processor, including a central processing unit (CPU), or a network processor (NP); or can be a digital signal processor (DSP), an application-specific integrated circuit (ASIC), a field programmable gate array (FPGA) or another programmable logic device, a discrete gate or a transistor logic device, or a discrete hardware component. The processor can implement or perform the methods, the steps, and logical block diagrams that are disclosed in one or more embodiments of the present specification. The general purpose processor can be a microprocessor, or the processor can be any conventional processor, etc. The steps of the methods disclosed in one or more embodiments of the present specification can be directly performed and completed by a hardware decoding processor, or can be performed and completed by using a combination of hardware and software modules in the decoding processor. The software module can be located in a mature storage medium in the field, for example, a random access memory, a flash memory, a read-only memory, a programmable read-only memory, an electrically erasable programmable memory, or a register. The storage medium is in the storage, and the processor reads information in the storage and completes the steps in the previous method with reference to hardware of the processor.

The electronic device can further perform the video matching method in FIG. 2 to FIG. 4. Details are omitted here in the present specification.

Certainly, in addition to a software implementation, another implementation of the electronic device is not excluded in the present specification, for example, a logic device or a combination of software and hardware. In other words, the execution body of the following processing procedure is not limited to each logic unit, and can be hardware or a logic device.

An embodiment of the present specification further provides a computer-readable storage medium. The computer-readable storage medium stores one or more programs, the one or more programs include an instruction, and when the instruction is executed by a portable electronic device including a plurality of application programs, the portable electronic device is enabled to perform the method in the embodiments shown in FIG. 2 to FIG. 4, and is specifically to perform the following operations: obtaining a plurality of feature vectors of a target video; retrieving a candidate video similar to the target video from a video database based on the plurality of feature vectors of the target video; constructing a time domain similarity matrix feature map between the target video and the candidate video based on the target video and the candidate video; and using the time domain similarity matrix feature map as an input into a deep learning detection model, to output a video segment matching the target video in the candidate video and a corresponding similarity. The deep learning detection model is obtained through training based on time domain similarity matrix feature maps of a plurality of groups of sample videos and corresponding labels, the sample video includes a query video and a candidate video corresponding to the query video, and the label corresponding to the sample video includes a video segment matching the query video in the sample video in the corresponding candidate video and an infringement flag.

In conclusion, the previous descriptions are only preferred embodiments of the present specification, but are not intended to limit the protection scope of the present specification. Any modification, equivalent replacement, or improvement made without departing from the spirit and principle of one or more embodiments of the present specification shall fall within the protection scope of the one or more embodiments of the present specification.

The system, apparatus, module, or unit described in the previous embodiments can be specifically implemented by using a computer chip or an entity, or implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

The computer readable medium includes persistent, non-persistent, movable, and unmovable media that can implement information storage by using any method or technology. Information can be a computer readable instruction, a data structure, a program module, or other data. A computer storage medium includes but is not limited to a phase change memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the description in the present specification, the computer readable medium does not include a transitory computer-readable media (transitory media), for example, a modulated data signal and carrier.

It is worthwhile to further note that in the present specification, the terms "include", "comprise", or any other variant thereof is intended to cover a non-exclusive inclusion, so that a process, a method, an article, or a device that includes a list of elements not only includes those elements but also includes other elements which are not expressly listed, or further includes elements inherent to such a process, method, article, or device. An element limited by "includes a . . . " does not, without more constraints, exclude the existence of additional identical elements in the process, method, article, or device that includes the element.

The one or more embodiments in the present specification are described in a progressive way. For same or similar parts in the one or more embodiments, reference can be made to each other. Each embodiment focuses on a difference from other embodiments. Particularly, a system embodiment is similar to a method embodiment, and therefore, is described briefly. For related parts, references can be made to partial descriptions in the method embodiment.

What is claimed is:

1. A computer-implemented method for video matching, comprising:
    obtaining a plurality of feature vectors of a target video;
    retrieving a candidate video similar to the target video from a video database based on the plurality of feature vectors of the target video;
    constructing a time domain similarity matrix feature map between the target video and the candidate video based on the target video and the candidate video; and
    using the time domain similarity matrix feature map as an input into a deep learning detection model, to output a video segment matching the target video in the candidate video and a corresponding similarity, wherein
        the deep learning detection model is obtained through training based on time domain similarity matrix feature maps of a plurality of groups of sample videos and corresponding labels, a sample video comprising a query video and a candidate video corresponding to the query video, and a corresponding label corresponding to the sample video comprises a video segment matching the query video in the sample video in a corresponding candidate video and an infringement flag.

2. The computer-implemented method of claim 1, wherein the retrieving a candidate video similar to the target video from a video database based on a plurality of feature vectors of the target video comprises:
    obtaining a feature vector retrieval result similar to the plurality of feature vectors of the target video from the video database; and
    obtaining the candidate video similar to the target video from the video database based on the feature vector retrieval result similar to the plurality of feature vectors of the target video.

3. The computer-implemented method of claim 2, wherein the constructing a time domain similarity matrix feature map between the target video and the candidate video based on the target video and the candidate video comprises:
    constructing a similarity matrix between the plurality of feature vectors of the target video and a plurality of feature vectors of the candidate video based on a vector retrieval result between the plurality of feature vectors of the target video and a plurality of feature vectors of each of the candidate video; and
    constructing the time domain similarity matrix feature map between the target video and the candidate video in a time domain dimension based on the similarity matrix between the plurality of feature vectors of the target video and the plurality of feature vectors of the candidate video.

4. The computer-implemented method of claim 3, wherein the constructing the time domain similarity matrix feature map between the target video and the candidate video in a time domain dimension based on the similarity matrix between the plurality of feature vectors of the target video and a plurality of feature vectors of each of the candidate video comprises:
    drawing the similarity matrix between the plurality of feature vectors of the target video and the plurality of feature vectors of the candidate video on a two-dimensional feature map based on a time domain mapping relationship between the target video and the candidate video, to obtain the time domain similarity matrix feature map between the target video and the candidate video.

5. The computer-implemented method of claim 4, wherein when there are a plurality of candidate videos, the drawing the similarity matrix between the plurality of feature vectors of the target video and a plurality of feature vectors of each of the candidate video on a two-dimensional feature map based on a time domain mapping relationship between the target video and the candidate video, to obtain the time domain similarity matrix feature map between the target video and the candidate video comprises:
    drawing a similarity matrix between the plurality of feature vectors of the target video and a plurality of feature vectors of each of a plurality of candidate videos on each of a plurality of two-dimensional feature maps based on a time domain mapping relationship between the target video and the plurality of candidate videos, to obtain a plurality of time domain similarity matrix feature maps between the target video and the plurality of candidate videos; and
    splicing the plurality of time domain similarity matrix feature maps between the target video and the plurality of candidate videos, to obtain a time domain similarity matrix feature map between the target video and the plurality of candidate videos.

6. The computer-implemented method of claim 1, wherein the using the time domain similarity matrix feature map as an input into a deep learning detection model, to output a video segment matching the target video in the candidate video and a corresponding similarity comprises:
    using the time domain similarity matrix feature map as the input into the deep learning detection model, to output, as a matched video segment, an interval range of the video segment matching the target video in the candidate video in a time domain dimension and a similarity between the target video and the matched video segment.

7. The computer-implemented method of claim 1, wherein the deep learning detection model comprises at least one of: a faster convolution neural network (CNN)-based candidate region detection model (faster region-based CNN (R-CNN)), a masked CNN-based candidate region detection model mask (R-CNN), a real-time object detection model (you only look once (YOLO)), and a single multi-box detection model (single-shot detector (SSD)).

8. A non-transitory, computer-readable medium storing one or more instructions executable by a computer system to perform operations comprising:
  obtaining a plurality of feature vectors of a target video;
  retrieving a candidate video similar to the target video from a video database based on the plurality of feature vectors of the target video;
  constructing a time domain similarity matrix feature map between the target video and the candidate video based on the target video and the candidate video; and
  using the time domain similarity matrix feature map as an input into a deep learning detection model, to output a video segment matching the target video in the candidate video and a corresponding similarity, wherein
    the deep learning detection model is obtained through training based on time domain similarity matrix feature maps of a plurality of groups of sample videos and corresponding labels, a sample video comprising a query video and a candidate video corresponding to the query video, and a corresponding label corresponding to the sample video comprises a video segment matching the query video in the sample video in a corresponding candidate video and an infringement flag.

9. The non-transitory, computer-readable medium of claim 8, wherein the retrieving a candidate video similar to the target video from a video database based on a plurality of feature vectors of the target video comprises:
  obtaining a feature vector retrieval result similar to the plurality of feature vectors of the target video from the video database; and
  obtaining the candidate video similar to the target video from the video database based on the feature vector retrieval result similar to the plurality of feature vectors of the target video.

10. The non-transitory, computer-readable medium of claim 9, wherein the constructing a time domain similarity matrix feature map between the target video and the candidate video based on the target video and the candidate video comprises:
  constructing a similarity matrix between the plurality of feature vectors of the target video and a plurality of feature vectors of the candidate video based on a vector retrieval result between the plurality of feature vectors of the target video and a plurality of feature vectors of each of the candidate video; and
  constructing the time domain similarity matrix feature map between the target video and the candidate video in a time domain dimension based on the similarity matrix between the plurality of feature vectors of the target video and the plurality of feature vectors of the candidate video.

11. The non-transitory, computer-readable medium of claim 10, wherein the constructing the time domain similarity matrix feature map between the target video and the candidate video in a time domain dimension based on the similarity matrix between the plurality of feature vectors of the target video and a plurality of feature vectors of each of the candidate video comprises:
  drawing the similarity matrix between the plurality of feature vectors of the target video and the plurality of feature vectors of the candidate video on a two-dimensional feature map based on a time domain mapping relationship between the target video and the candidate video, to obtain the time domain similarity matrix feature map between the target video and the candidate video.

12. The non-transitory, computer-readable medium of claim 11, wherein when there are a plurality of candidate videos, the drawing the similarity matrix between the plurality of feature vectors of the target video and a plurality of feature vectors of each of the candidate video on a two-dimensional feature map based on a time domain mapping relationship between the target video and the candidate video, to obtain the time domain similarity matrix feature map between the target video and the candidate video comprises:
  drawing a similarity matrix between the plurality of feature vectors of the target video and a plurality of feature vectors of each of a plurality of candidate videos on each of a plurality of two-dimensional feature maps based on a time domain mapping relationship between the target video and the plurality of candidate videos, to obtain a plurality of time domain similarity matrix feature maps between the target video and the plurality of candidate videos; and
  splicing the plurality of time domain similarity matrix feature maps between the target video and the plurality of candidate videos, to obtain a time domain similarity matrix feature map between the target video and the plurality of candidate videos.

13. The non-transitory, computer-readable medium of claim 8, wherein the using the time domain similarity matrix feature map as an input into a deep learning detection model, to output a video segment matching the target video in the candidate video and a corresponding similarity comprises:
  using the time domain similarity matrix feature map as the input into the deep learning detection model, to output, as a matched video segment, an interval range of the video segment matching the target video in the candidate video in a time domain dimension and a similarity between the target video and the matched video segment.

14. The non-transitory, computer-readable medium of claim 8, wherein the deep learning detection model comprises at least one of: a faster convolution neural network (CNN)-based candidate region detection model (faster region-based CNN (R-CNN)), a masked CNN-based candidate region detection model mask (R-CNN), a real-time object detection model (you only look once (YOLO)), and a single multi-box detection model (single-shot detector (SSD)).

15. A computer-implemented system, comprising:
  at least two processors; and
  one or more computer memory devices interoperably coupled with the at least two processors and having tangible, non-transitory, machine-readable media storing one or more instructions that, when executed by the at least two processors, perform one or more operations comprising:
    obtaining a plurality of feature vectors of a target video;
    retrieving a candidate video similar to the target video from a video database based on the plurality of feature vectors of the target video;
    constructing a time domain similarity matrix feature map between the target video and the candidate video based on the target video and the candidate video; and
    using the time domain similarity matrix feature map as an input into a deep learning detection model, to output a video segment matching the target video in the candidate video and a corresponding similarity, wherein the deep learning detection model is obtained through training based on time domain similarity matrix feature maps of a plurality of groups of sample videos and corresponding labels, a sample video comprising a query video and a candidate video corresponding to the query video, and a corresponding label corresponding to the sample video comprises a video segment matching the query video in the sample video in a corresponding candidate video and an infringement flag.

16. The computer-implemented system of claim 15, wherein the retrieving a candidate video similar to the target video from a video database based on a plurality of feature vectors of the target video comprises:
obtaining a feature vector retrieval result similar to the plurality of feature vectors of the target video from the video database; and
obtaining the candidate video similar to the target video from the video database based on the feature vector retrieval result similar to the plurality of feature vectors of the target video.

17. The computer-implemented system of claim 16, wherein the constructing a time domain similarity matrix feature map between the target video and the candidate video based on the target video and the candidate video comprises:
constructing a similarity matrix between the plurality of feature vectors of the target video and a plurality of feature vectors of the candidate video based on a vector retrieval result between the plurality of feature vectors of the target video and a plurality of feature vectors of each of the candidate video; and
constructing the time domain similarity matrix feature map between the target video and the candidate video in a time domain dimension based on the similarity matrix between the plurality of feature vectors of the target video and the plurality of feature vectors of the candidate video.

18. The computer-implemented system of claim 17, wherein the constructing the time domain similarity matrix feature map between the target video and the candidate video in a time domain dimension based on the similarity matrix between the plurality of feature vectors of the target video and a plurality of feature vectors of each of the candidate video comprises:
drawing the similarity matrix between the plurality of feature vectors of the target video and the plurality of feature vectors of the candidate video on a two-dimensional feature map based on a time domain mapping relationship between the target video and the candidate video, to obtain the time domain similarity matrix feature map between the target video and the candidate video.

19. The computer-implemented system of claim 18, wherein when there are a plurality of candidate videos, the drawing the similarity matrix between the plurality of feature vectors of the target video and a plurality of feature vectors of each of the candidate video on a two-dimensional feature map based on a time domain mapping relationship between the target video and the candidate video, to obtain the time domain similarity matrix feature map between the target video and the candidate video comprises:
drawing a similarity matrix between the plurality of feature vectors of the target video and a plurality of feature vectors of each of a plurality of candidate videos on each of a plurality of two-dimensional feature maps based on a time domain mapping relationship between the target video and the plurality of candidate videos, to obtain a plurality of time domain similarity matrix feature maps between the target video and the plurality of candidate videos; and
splicing the plurality of time domain similarity matrix feature maps between the target video and the plurality of candidate videos, to obtain a time domain similarity matrix feature map between the target video and the plurality of candidate videos.

20. The computer-implemented system of claim 15, wherein the using the time domain similarity matrix feature map as an input into a deep learning detection model, to output a video segment matching the target video in the candidate video and a corresponding similarity comprises:
using the time domain similarity matrix feature map as the input into the deep learning detection model, to output, as a matched video segment, an interval range of the video segment matching the target video in the candidate video in a time domain dimension and a similarity between the target video and the matched video segment.

21. The computer-implemented system of claim 15, wherein the deep learning detection model comprises at least one of: a faster convolution neural network (CNN)-based candidate region detection model (faster region-based CNN (R-CNN)), a masked CNN-based candidate region detection model mask (R-CNN), a real-time object detection model (you only look once (YOLO)), and a single multi-box detection model (single-shot detector (SSD)).

* * * * *